United States Patent [19]

Filiberti

[11] Patent Number: 4,714,236
[45] Date of Patent: Dec. 22, 1987

[54] BALL VALVE, PARTICULARLY FOR GASES

[76] Inventor: Antonio Filiberti, Via Per Alzo, 48, 28017 S. Maurizio D'Opaglio, Novara, Italy

[21] Appl. No.: 8,778

[22] Filed: Jan. 30, 1987

Related U.S. Application Data

[63] Continuation-in-part of Ser. No. 846,033, Mar. 31, 1986, abandoned.

[30] Foreign Application Priority Data

Jan. 24, 1986 [IT]  Italy ............................. 20736/86[U]

[51] Int. Cl.⁴ .............................................. F16K 3/22
[52] U.S. Cl. .................................... 251/315; 251/214; 251/312
[58] Field of Search ........................ 251/214, 312, 315

[56] References Cited

U.S. PATENT DOCUMENTS

| | | | |
|---|---|---|---|
| 3,030,067 | 4/1962 | Manor | 251/214 |
| 3,254,972 | 6/1966 | Roos | 251/312 X |
| 3,360,236 | 12/1967 | Hulslander | 251/312 X |
| 4,379,557 | 4/1983 | Saka | 251/214 X |
| 4,449,695 | 5/1984 | Alexander et al. | 251/214 |
| 4,538,790 | 9/1985 | Williams et al. | 251/312 X |

FOREIGN PATENT DOCUMENTS

| | | | |
|---|---|---|---|
| 1233525 | 5/1971 | United Kingdom | 251/315 |
| 2037952 | 7/1980 | United Kingdom | 251/315 |

Primary Examiner—Gerald A. Michalsky
Attorney, Agent, or Firm—Kirschstein, Kirschstein, Ottinger & Israel

[57] ABSTRACT

An improved ball valve, particularly for gases, includes a case of unitary construction accommodating a hollow ballshutter supported between two juxtaposed gaskets and being controllable rotatively through a screw block having an external knob grip. The screw block accommodates, in addition to a gasket for the necessary seal, also a gasket capable of withstanding high temperatures. The screw block is held in place within the case by a bent wire segment of annular shape fitting in a specially provided annular seat formed in the case, and is located by a countersunk lockwasher.

11 Claims, 8 Drawing Figures

BALL VALVE, PARTICULARLY FOR GASES

CROSS-REFERENCE TO RELATED APPLICATION

The present application is a continuation-in-part of pending application Ser. No. 846,033, filed Mar. 31, 1986, now abandoned.

BACKGROUND OF THE INVENTION

1. Field of the Invention

This invention generally relates to an improved ball valve for fluids and, more particularly, to the accurate positioning of a control block within a jut at such a valve.

2. Description of Related Art

Ball valves of this general type have been known in a variety of different constructions. In practice, they all reveal some deficiencies and disadvantages which broadly originate from the very constructions of such valves exhibiting a large number of component parts, heavy weight, and substantial bulk dimensions. A further significant drawback of prior ball valve designs is that their assembly is troublesome, involves a large number of individual steps, and cannot be automated.

Still another disadvantage of prior valves, especially when used for gases, is that they fail to provide a really tight seal in a very high temperature environment, such as in a fire situation. Being incapable of withstanding the high temperatures of a fire situation, even with the valve shut down, gas is apt to leak out shortly and boost the flames, or explode and cause additional damage.

Furthermore, a disadvantage of prior valves is to be found in the means employed to secure and/or locate the control screw block requiring fine machining and/or the use of expensive components, which reflects adversely on the overall manufacturing costs.

SUMMARY OF THE INVENTION

Objects of the Invention

It is a primary object of this invention to provide an improved ball valve as indicated, which can obviate the problems posed by such prior designs and be easily manufactured, while being of low weight and bulk and effective to prevent a fluid being conveyed and/or shut off from leaking out even in a condition of high outside temperature, such as may be encountered, for example, in a fire situation.

Another object of this invention is to provide an improved ball valve having a limited number of components.

It is a further object of the invention to provide a ball valve of a highly compact design, thereby minimizing its space requirements for installation.

Still another object is to arrange for the valve of this invention to be simple and quick to assemble, advantageously on automated equipment.

A not unimportant advantage of the inventive ball valve is that it is easily disassembled, which is especially convenient for overhauling, replacement, or the like purposes.

Features of the Invention

According to the invention, such objects are achieved by a ball valve, particularly for gases, which comprises a valve body bounding a fluid flow-through passage, and having a tubular jut extending along an axis. Inlet and outlet fittings on the body communicate with the passage. A ball shutter is mounted in the passage for turning about the axis. A pair of seals are mounted in the passage on opposite lateral sides of the shutter. Each seal sealingly engages a respective fitting and a respective side of the shutter during said turning. In order to open and close the valve, a control block is mounted in the jut for turning about the axis, and a handle is located exteriorly of the body. The block is operatively connected to the shutter. The handle is mounted on the block between open and closed valve positions.

In accordance with the instant invention, means are provided on the jut for bounding an annular enlarged groove which opens radially inwardly toward the axis. The control block has a mounting surface, and an annular reduced neck extending axially above the mounting surface. Means are provided for aligning the control block for turning about the axis. This alignment means includes an annular washer and an elongated resilient locking element.

The washer surrounds the reduced neck with radial clearance, and is mounted on the mounting surface for radially inward displacement toward the neck, and for radially outward displacement into the enlarged groove. This inward and outward displacement is effected during insertion in a lengthwise manner of the locking element into and along the enlarged groove. The locking element resiliently bears against and inwardly and outwardly displaces different portions of the washer during such insertion. After insertion, the locking element lockingly secures the control block in alignment with the axis.

Thus, the accurate positioning of the control block within the jut is assured. The control block and the shutter will both turn about the axis without misalignment during assembly of the valve.

The ball valve of this invention affords several advantages. It may be fabricated from a small number of components which can be easily manufactured, are inexpensive and easy to assemble, which facilitates its installation even in confined conditions. Its compact design, combined with a hollow formed in the ball shutter, results in lighter weight, with attendant economy of construction, the material removed being, in fact, recoverable by smelting. The valve tightness remains intact even in the presence of a very huge ambient temperature, such as is the case in fire situations.

BRIEF DESCRIPTION OF THE DRAWINGS

Further features, advantages and details of the ball valve according to this invention will be more clearly apparent from the following description, to be taken in conjunction with the accompanying drawings which show a preferred embodiment thereof.

Throughout the drawing figures, drawn to different scales for clarity, similar parts are designated with the same reference characters.

DESCRIPTION OF THE PREFERRED EMBODIMENT

Figure 1:
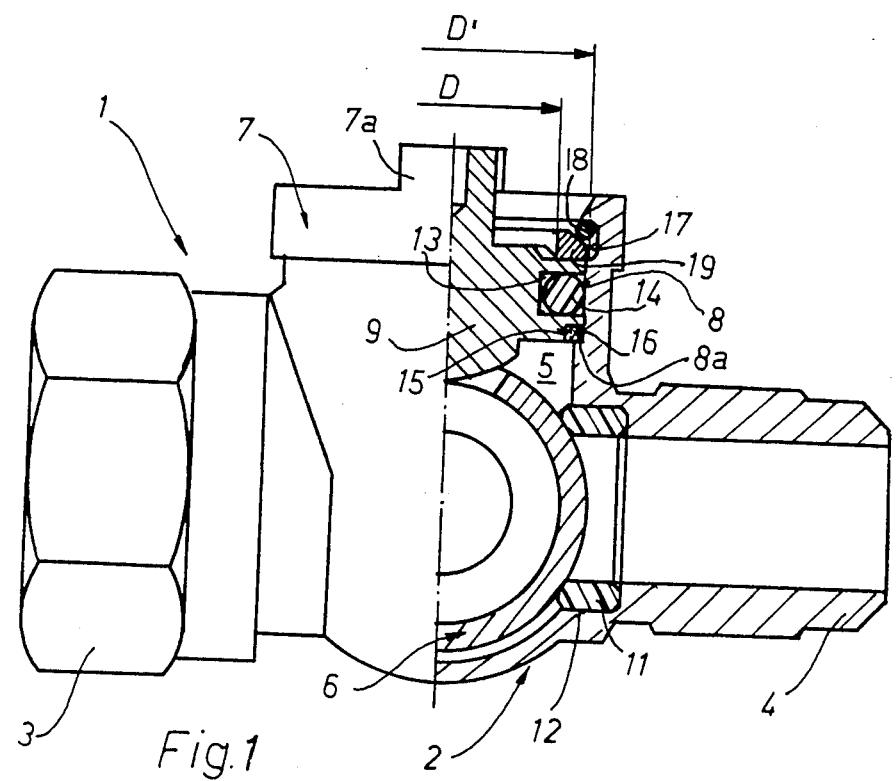
FIG. 1 shows a ball valve according to the invention, half in section and half in side elevation, without its control knob.
Figure 2:
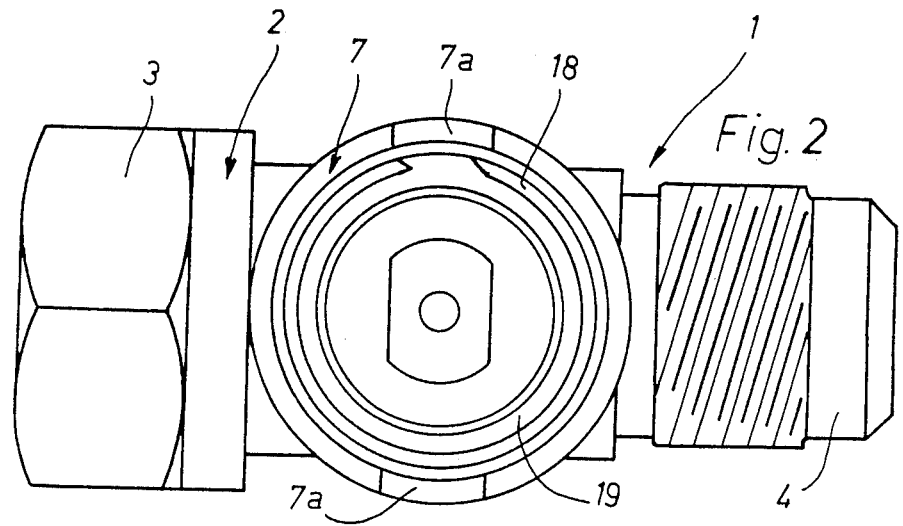
FIG. 2 is a view of the valve of FIG. 1 from above.
Figure 2A:
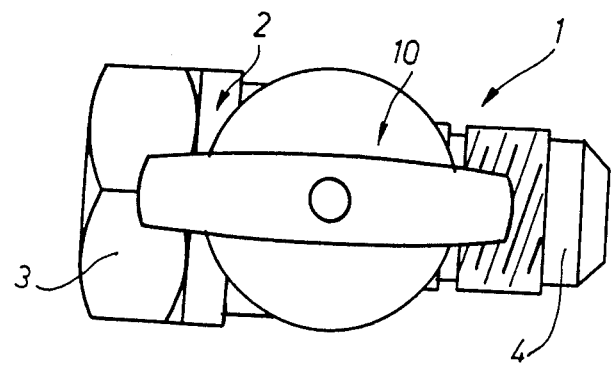
FIG. 2A is a view of the valve of FIG. 1 with the control knob installed.
Figure 3:
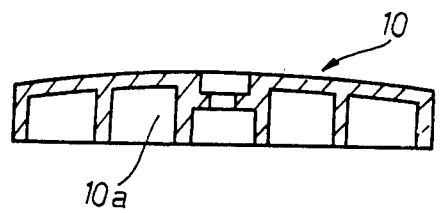
FIG. 3 is a longitudinal mid-section through the control knob.

The improved ball valve, particularly for gases, according to the invention, is comprehensively designated by reference numeral 1. It comprises a case or valve body 2 of unitary construction, wherein inlet and outet fittings are formed, namely, a fitting 3 and a fitting 4, in the example shown female and male fittings, respectively. It also includes a chamber 5 adapted to accommodate a ball shutter 6, and a tubular jut 7 defining a seat 8 for a screw or control block 9 controlling the shutter 6. The control knob or handle for the screw block 9 is indicated at 10.

Figure 7:
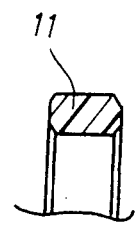
FIG. 7 is a cross-section view taken through a sealing gasket for the ball shutter of this invention.

As is well known in the art and shown in FIG. 1, the ball shutter 6 fits between two identical juxtaposed gaskets or seals 11, which fit in turn in a respective seat 12 formed in the valve case 2. According to the invention, and as may be seen in FIGS. 1 and 7, the proposed gaskets 11 have a symmetrical configuration both in the horizontal and vertical planes, the bevels provided allowing for interchangeable, that is, alway true, insertion of the gaskets. It follows, therefore, that the same and the ball shutter 6 can be assembled automatically and that an optimum seal can be achieved for the shutter 6. The seats 12 should not be, on the other hand, profile cut but merely have mutually orthogonal sides.

Figure 4:
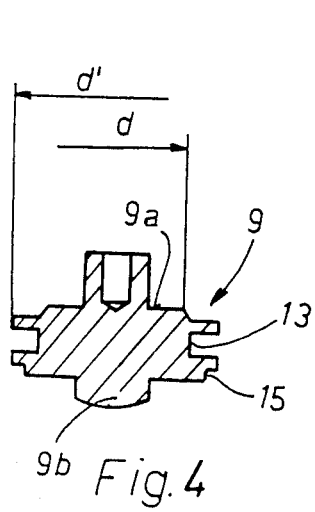
FIG. 4 is a vertical mid-section through the control screw block of the ball shutter.

According to the invention, moreover, the screw block 9 has on its outer lateral surface a first groove 13 for accommodating a sealing gasket, preferably an O-ring 14, as well as a further seat 15 for accommodating a gasket 16 of a high temperature-resistant material, such as asbestos. As may be seen in FIGS. 1 and 4, the seat 15 formed at the bottom end of the screw block 9, or end facing the shutter 6 enables the gasket 16, with the screw block 9 fitted to its seat 8, to abut against the step side 8a of said seat 8. Thus, said gasket 16 will act as a "flame arrester" and maintain a tight seal even with a high outside temperature. The same is, as mentioned, advantageously formed from asbestos or equivalent thereof.

FIG. 1 shows, moreover, that in the seat 8, at the top end of the screw block 9, there is formed a seat 17 in the form of an annular enlarged groove. The groove 17 is arranged to accommodate simplified securing, that is, alignment,means for the screw block 9. Such alignment means are, according to the invention, an annular resilient wire segment or locking element 18 with a countersunk annular washer 19 associated therewith. The washer has a slightly greater inside diameter D than the outside diameter d of an annular elevation or reduced neck 9a of the screw block 9 and has an outside diameter D' substantially equal to the outside diameter d' of the screw block 9. The top side of said washer 19 is frusto-conical in shape, and has an outwardly decreasing slope. The washer 19 surrounds the reduced neck 9a with radial clearance. The washer is radially inwardly displaceable toward the neck 9a, and is radially outwardly displaceable into the enlarged groove 17. With this construction, automatic assembly of the various valve components becomes feasible.

The inward and outward displacement is effected during insertion of a continuous elongated wire segment which is payed off a supply reel, lengthwise into and along the enlarged groove 17. After turning the segment through about 330°-340°, the segment is cut off and, owing to its elasticity, made to stay in said groove 17 in a pre-loaded state. The segment resiliently bears against and inwardly and outwardly displaces different portions of the washer 19 during such insertion. After insertion, the segment 18 lockingly secures the block 9 in alignment with a vertical axis of symmetry. The device for applying and cutting said locking wire 18 is not illustrated because it is foreign to this invention.

Good results have been obtained using a bronze wire for the segment 18.

Figure 5:
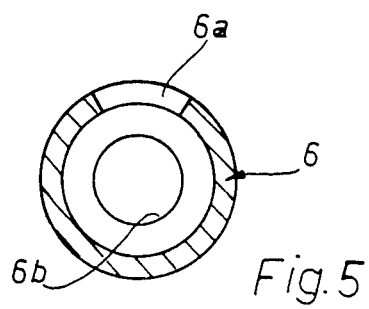
FIGS. 5 and 6 show, respectively, vertical cross-sections taken at 90° from each other through the ball shutter of this invention.
Figure 6:
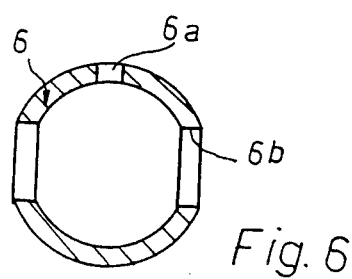

In order to lighten the valve of this invention, that is, to reduce the amount of material consumed, the ball shutter 6, instead of having as usual a cross bore formed therein, is further hollowed out as shown clearly in FIGS. 5 and 6.

For completeness of illustration, indicated at 9b is the jut of the screw block 9 for engagement with the seat 6a of the ball shutter 6. Indicated at 6b in the latter is the passage known, per se, for the fluid, having a diameter substantially equal to the inside diameter of the gaskets 11. The known passage is shown in FIG. 6 to better bring out the hollowed part of the ball shutter 6 of this invention.

The control knob 10 has two inner chambers 10a each arranged to cooperate with a jut 7a formed on the tubular jut 7 to product a 90° rotation of said knob 10. Such details are no further illustrated herein because they are selected as desired by the skilled person and are foreign to this invention.

It may be appreciated from the foregoing discussion that the ball valve of this invention, particularly intended for gases, effectively achieves the objects set forth and affords the advantages specified above.

All the parts may be individually replaced with technical and/or functional equivalents thereof, without departing from the protection scope of the present invention.

The materials, dimensions, and geometrical shapes of the individual parts may be selected as desired.

All the features to be inferred from the specification, claims and drawings are regarded as being substantial to this invention, both individually and in any combinations thereof.

I claim:

1. A ball valve, comprising:
(A) a valve body bounding a fluid flow-through passage and having a tubular jut extending along an axis;
(B) inlet and outlet fittings on the body and communicating with the passage;
(C) a ball shutter mounted in the passage for turning about the axis;
(D) a pair of seals mounted in the passage on opposite lateral sides of the shutter, each seal sealingly engaging a respective fitting and a respective side of the shutter during said turning;
(E) control means for opening and closing the valve, including a control block mounted in the jut for turning about the axis and operatively connected to the shutter, and a handle located exteriorly of the body and mounted on the control block for turning the latter and, in turn, the shutter about the axis between open and closed valve positions;

(F) means on the jut for bounding an annular, enlarged groove which opens radially inwardly toward the axis;
(G) said control block having a mounting surface, and an annular, reduced neck extending axially above the mounting surface; and
(H) means for aligning the control block for turning about the axis, including
  (i) an annular washer surrounding the reduced neck with radial clearance and mounted on the mounting surface for radially inward displacement toward the neck, and for radially outward displacement into the enlarged groove, and
  (ii) an elongated resilient locking element insertable lengthwise into and along the enlarged groove, said locking element resiliently bearing against, and inwardly and outwardly displacing, different portions of the washer during such insertion, said locking element lockingly securing the control block in alignment with the axis after insertion.

2. The ball valve as recited in claim 1, wherein the enlarged groove has upper and lower surfaces spaced axially apart, and wherein the lower surface of the groove is at the same elevation as the mounting surface.

3. The ball valve as recited in claim 2, wherein the neck has a frusto-conical shape and tapers outwardly toward the mounting surface, said neck having an annular end wall of a predetermined diameter; and wherein the washer has a central circular opening having a diameter greater than said predetermined diameter.

4. The ball balve as recited in claim 3, wherein the control block has an outside diameter of a certain dimension, and wherein the washer has an outside dimension substantially equal to said certain dimension.

5. The ball valve as recited in claim 4, wherein the washer has a radially outwardly tapered bearing surface facing, and bearing against, the inserted locking element.

6. The ball valve as recited in claim 2, wherein the locking element has a predetermined cross-sectional size, and wherein the upper and lower surfaces of the groove are spaced axially apart of each other by a distance which is greater than said predetermined size of the locking element.

7. The ball valve as recited in claim 1, wherein the inserted locking element is a circumferentially-incomplete wire extending over an arc in the range of 180° to 360°.

8. The ball valve as recited in claim 7, wherein the arc is in the range of 330° to 340°.

9. The ball valve as recited in claim 1, wherein the control block has an annular seat which opens into the passage; and further comprising a heat-resistant annular seal mounted in the seat and sealingly insolating the passage from elevated temperatures exterior of the valve.

10. The ball valve as recited in claim 9, wherein the heat-resistant seal is constituted of asbestos.

11. The ball valve as recited in claim 9; and further comprising an annular channel formed in the control block, and a fluid sealing annular gasket mounted in the channel and sealingly engaging the jut.

* * * * *